(12) United States Patent
Waldorf (10) Patent No.: US 7,125,068 B2
(45) Date of Patent: Oct. 24, 2006

(54) TRANSFER TRAILER

(76) Inventor: Merle K. Waldorf, 6280 W. Vienna Rd., Clio, MI (US) 48420

( * ) Notice: Subject to any disclaimer, the term of this patent is extended or adjusted under 35 U.S.C. 154(b) by 146 days.

(21) Appl. No.: 10/900,544

(22) Filed: Jul. 28, 2004

(65) Prior Publication Data

US 2006/0022489 A1    Feb. 2, 2006

(51) Int. Cl.
*B60J 5/06*    (2006.01)
(52) U.S. Cl. .................... 296/181.1; 296/182.1
(58) Field of Classification Search ............ 296/182.1, 296/184.1, 185.1, 186.1, 186.4, 181.1, 181.3, 296/181.5, 100.01, 100.02, 100.06, 100.08, 296/100.09, 100.1, 100.12, 100.14, 100.17, 296/36
See application file for complete search history.

(56) References Cited

U.S. PATENT DOCUMENTS 1,600,531 A * 9/1926 Bourgon ................... 296/210
2,711,343 A * 6/1955 Falk et al. .................. 49/205
4,489,975 A * 12/1984 Fredin ..................... 296/186.4
4,627,658 A   12/1986 Vold et al. ............... 296/100.1
5,711,566 A   1/1998 Lesmeister et al. ...... 296/26.15
6,554,346 B1 * 4/2003 Sugimoto ................... 296/147
6,890,020 B1 * 5/2005 Bush, Sr. ................. 296/186.4
6,896,316 B1 * 5/2005 Taylor ..................... 296/182.1

* cited by examiner

*Primary Examiner*—Lori L. Coletta
(74) *Attorney, Agent, or Firm*—Bliss McGlynn, P.C.

(57) ABSTRACT

A transfer trailer includes a floor, a top covering, and at least a pair of walls. At least one of the pair of walls and the top covering are movable relative to the floor between closed and opened positions. In the opened positions, the trailer provides an opening for directly receiving the articles from the loading apparatus. The trailer includes also a controller for controlling the movement of the movable wall and the top covering. The top covering is hingedly attached to the movable wall and the other of the pair of walls along corresponding imaginary lines of attachment defining corresponding axes. The movable wall is rotatable about the axis defined by the imaginary line attaching the movable wall and the top covering, and the top covering is rotatable about the axis defined by the imaginary line attaching the top covering and the other of the pair of walls.

16 Claims, 5 Drawing Sheets

TRANSFER TRAILER

BACKGROUND OF THE INVENTION

1. Field of the Invention

The present invention relates, generally, to a trailer and, more particularly, to a semi-trailer of the transfer type adapted to transport debris or loose articles.

2. Description of the Related Art

A semi-trailer of the transfer type is adapted to transport debris or loose articles. By way of example, and not by way of limitation, the loose articles may include crushed vehicles, lumber, and/or coils, just to name a few. In general, the semi-trailer includes a tractor and a detachable trailer adapted to be partly supported by the rear of the tractor and pulled by the tractor. Such a tractor is well known in the art and can be of any suitable type that allows the trailer to be attached to and pulled by the tractor such that the trailer can haul crushed vehicles, for example.

Typically, the trailer includes a plurality of wheels for moving the trailer and a floor supported above the wheels for carrying the crushed vehicles. It is known for the trailer to be open at the top of the trailer. In this regard, the trailer can be a flatbed. Alternatively, the trailer can have side walls extending upwardly from the perimeter of the floor to define a container for receiving the crushed vehicles.

In operation, a loader, operating a loading apparatus, directly loads the crushed vehicles onto the floor of the trailer. The crushed vehicles can be loaded one or a plurality at a time and are often stacked in columns or rows to substantially cover the floor of the flatbed to a certain height or fill the volume defined by the container. Once the trailer has been loaded, another person securely binds the crushed vehicles to each other and the floor or within the container by using binders or chains, which are frequently tied down to posts or eyes provided on the floor or walls of the trailer.

The loading process usually requires at least three people—the driver, loader, and binder. And, depending upon the load requirement, the loading capacity of the loading apparatus, and the size of the trailer, the loading process can take about an hour and a half to complete. When the steps of transporting and unloading the crushed vehicles are included, the entire process can take about four hours to complete. Using a trailer having a length of about forty feet, it is not uncommon to load, transport, and unload about thirty tons of crushed vehicles.

However, since the binders or chains do not completely cover the crushed vehicles, it is still possible for individual parts of a crushed vehicle to become separated from the vehicle and fly out of the trailer, especially when the trailer reaches sufficiently excessive speeds during transport. As a result, such a trailer is now subject to federal, state, or municipal laws or regulations, which prohibit the trailer's uncovered use in transport on roads and highways. These laws or regulations are designed to prevent the debris or loose articles from flying out of the trailer and onto roads and highways, thereby creating hazards to traffic and polluting the environment with such debris or articles. As such, a covering for each trailer is mandated by the laws or regulations to prevent these hazards and pollution.

A variety of devices are known for covering such a trailer. For instance, it is known to place a tarpaulin covering over the opening defined by the top of the trailer and tied down to the posts or eyes provided on the floor or walls of the trailer to cover the trailer. It is also known to still use binders or chains to tie down the crushed vehicles, for example, prior to such placement of the covering. Alternatively and with special application to a flatbed, the binders or chains can be placed over the covering and tied down to the posts or eyes to tie down the covering and crushed vehicles.

However, covering the opening or tying down the crushed vehicles in these ways is inconvenient for a person loading and unloading the trailer. More specifically, such covering or tying down requires a great amount of physical effort of the loader/unloader and possible inherent physical danger and discomfort to the loader/unloader. This is especially so when the loader/unloader uses binders or chains by hand. Such covering or tying down also provides limited access to the inside of the trailer through the top of the trailer. Such covering or tying down also is relatively labor-intensive and time-consuming. Such covering or tying down also is relatively inefficient and, thus, unproductive.

Thus, there is a need for such a transfer trailer that permits relatively more efficiency and, thus, productivity in loading, transporting, and unloading the articles. There is a need for such a transfer trailer that also is relatively more convenient for a person loading and unloading the trailer. There is a need for such a transfer trailer that also requires a relatively less amount of physical effort of the loader/unloader and possible inherent physical danger and discomfort to the loader/unloader. There is a need for such a transfer trailer that also does not require use of binders or chains to load and transport the articles. There is a need for such a transfer trailer that also provides relatively more access to the inside of the trailer through the top of the trailer. There is a need for such a transfer trailer that is also relatively less labor-intensive and time-consuming to load and unload.

SUMMARY OF THE INVENTION

The invention overcomes the disadvantages in the related art in a transfer trailer defining a container for directly receiving articles from a loading apparatus and removably attachable to a tractor for transporting the articles. The trailer includes a floor, a top covering spaced from the floor and adapted to substantially cover a top of the container, and at least a pair of walls adapted to substantially cover respective sides of the container and extend substantially between the floor and the top covering. At least one of the pair of walls and the top covering are movable relative to the floor between a closed position and an opened position. When the movable wall and the top covering are in the opened position, the trailer provides an opening into the top and the respective side of the container for directly receiving the articles from the loading apparatus. The trailer includes also a controller for controlling the movement of the movable wall and the top covering between the closed position and the opened position. The top covering is hingedly attached to the movable wall and the other of the pair of walls along corresponding imaginary lines of attachment defining corresponding axes. The movable wall is rotatable about the axis defined by the imaginary line attaching the movable wall and the top covering, and the top covering is rotatable about the axis defined by the imaginary line attaching the top covering and the other of the pair of walls.

One advantage of the transfer trailer of the present invention is that it permits relatively more efficiency and, thus, productivity in loading, transporting, and unloading the articles.

Another advantage of the transfer trailer of the present invention is that it is relatively more convenient for a person loading and unloading the trailer.

Another advantage of the transfer trailer of the present invention is that it requires a relatively less amount of physical effort of the loader/unloader and possible inherent physical danger and discomfort to the loader/unloader.

Another advantage of the transfer trailer of the present invention is that it does not require use of binders or chains to load and transport the articles.

Another advantage of the transfer trailer of the present invention is that it provides relatively more access to the inside of the trailer through the top of the trailer.

Another advantage of the transfer trailer of the present invention is that it is relatively less labor-intensive and time-consuming to load and unload.

Another advantage of the transfer trailer of the present invention is that it permits a loading apparatus to directly load the articles into and unload the articles from the trailer.

Another advantage of the transfer trailer of the present invention is that it reduces or eliminates spillage of the articles upon loading, transport, and unloading of the articles.

Another advantage of the transfer trailer of the present invention is that it permits loading, transport, and unloading of articles of various kinds, sizes, and numbers.

Other objects, features, and advantages of the transfer trailer of the present invention will be readily appreciated as the same becomes better understood while reading the subsequent description taken in conjunction with the accompanying drawings.

DETAILED DESCRIPTION OF THE INVENTION

Figure 1:
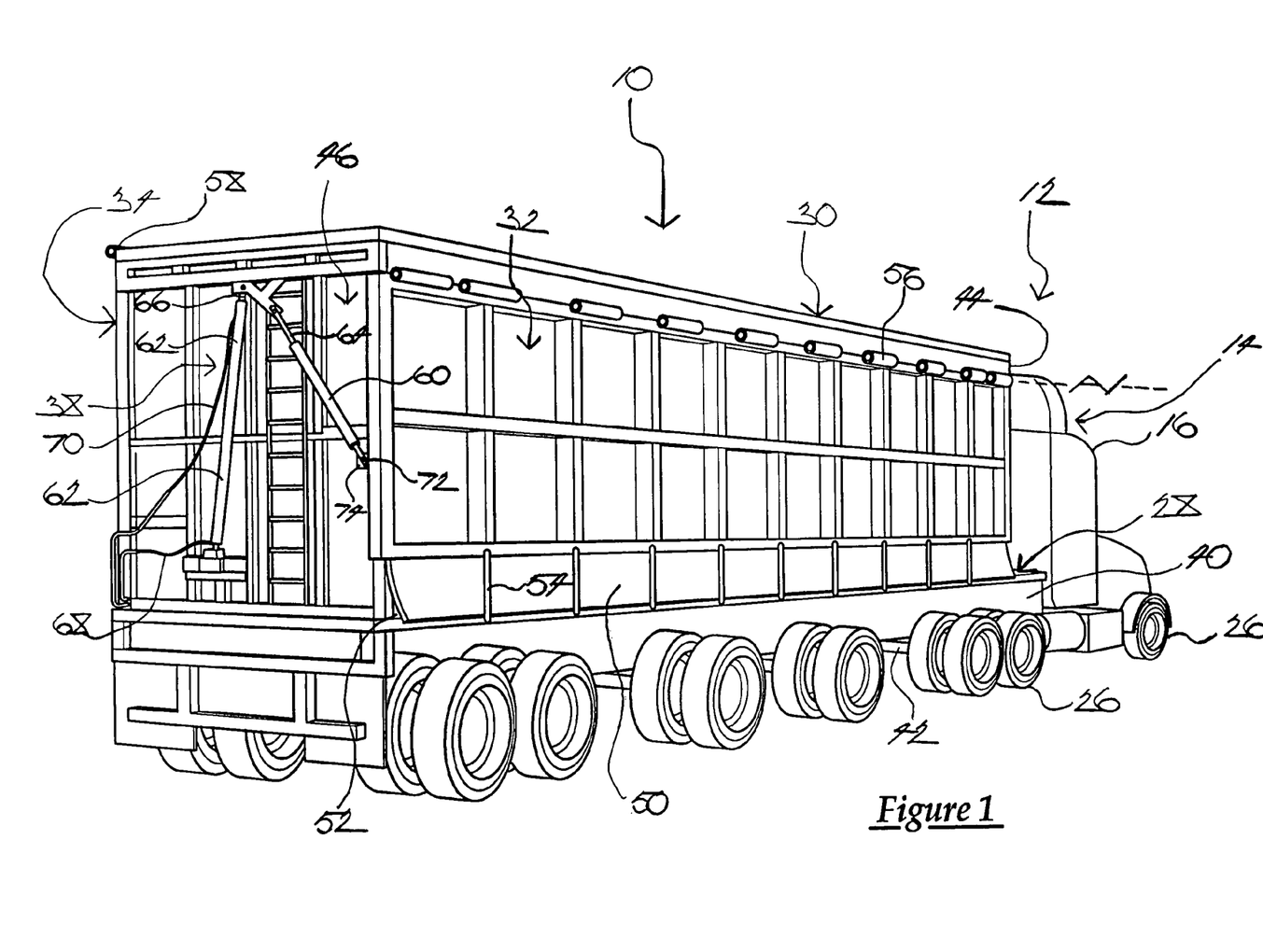
FIG. 1 is a perspective view of a semi-trailer showing a transfer trailer according to an embodiment of the present invention in a completely closed position and attached to a tractor.
Figure 2:
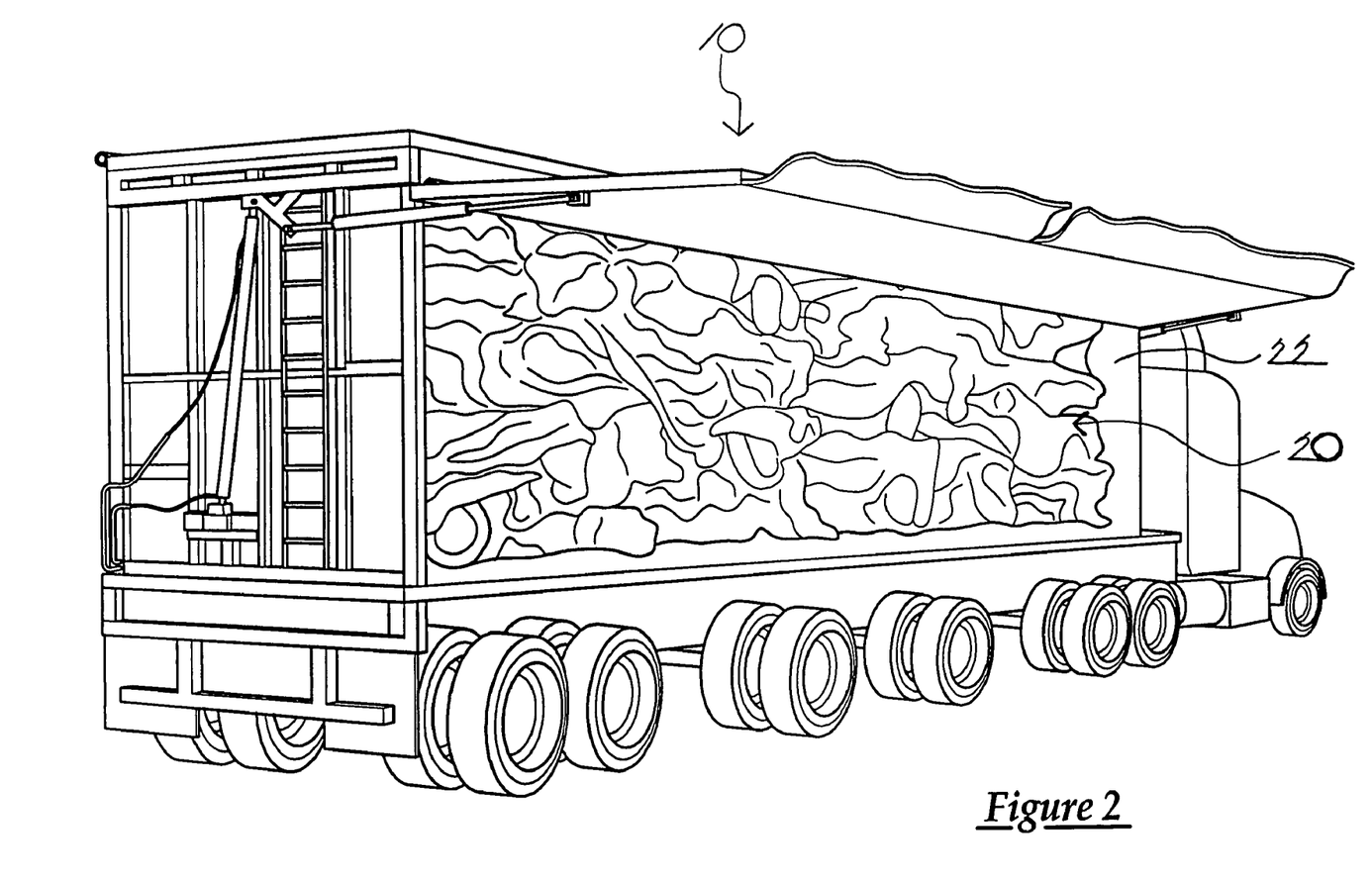
FIG. 2 is the perspective view of FIG. 1 showing the movable side wall of the transfer trailer of the present invention in a completely opened position.
Figure 4:
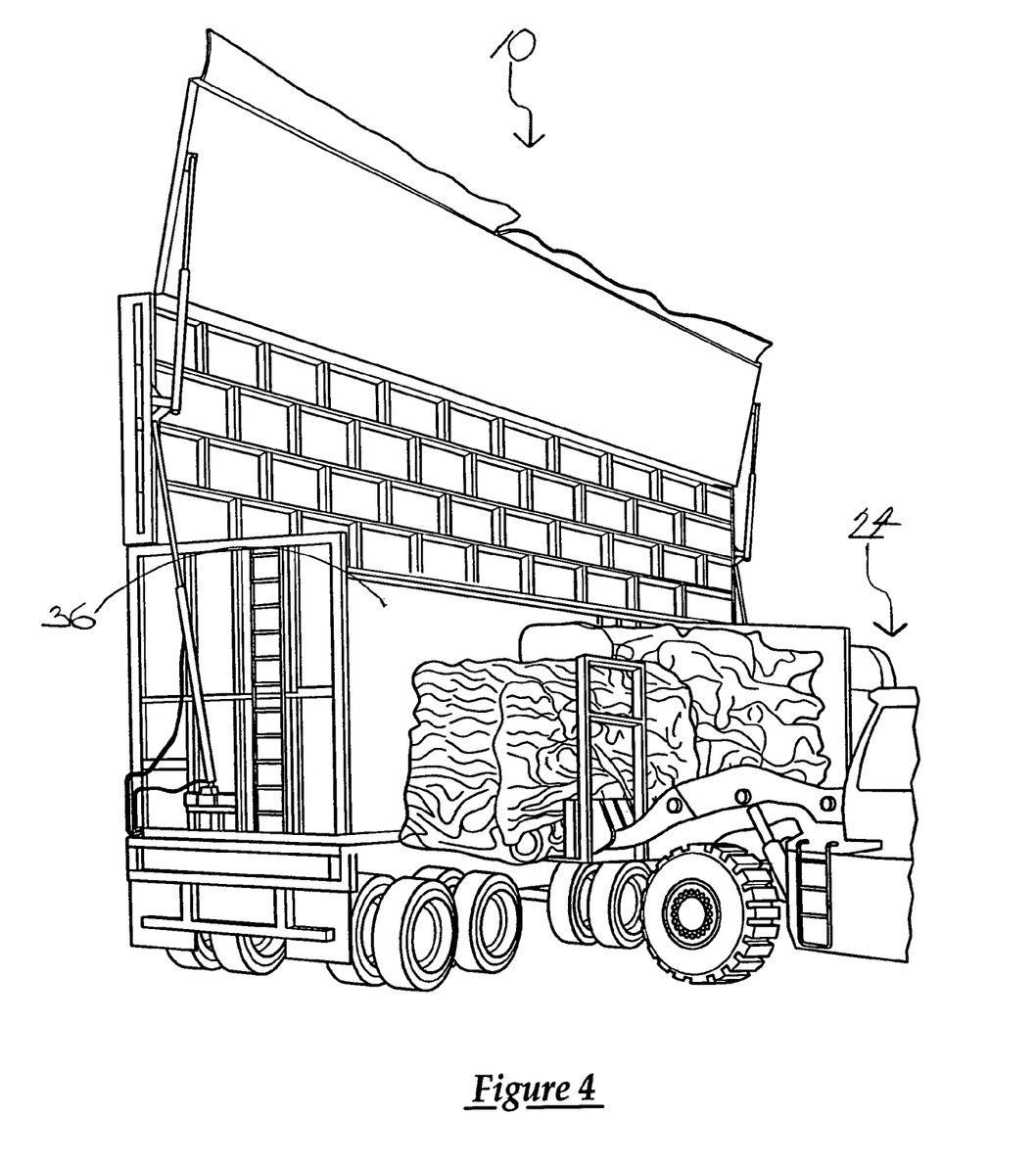
FIG. 4 is the perspective view of FIG. 3 showing the movable top covering of the transfer trailer of the present invention in a completely opened position.
Figure 5:
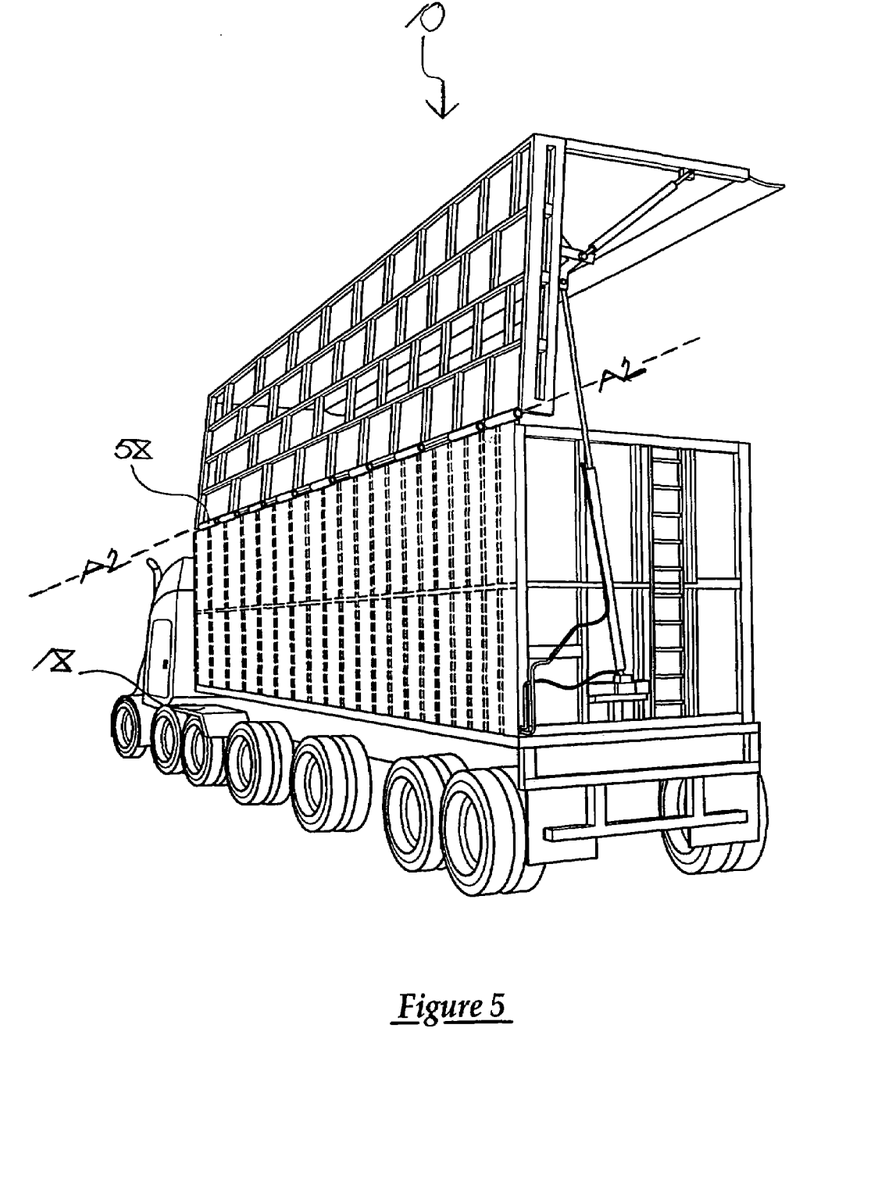
FIG. 5 is the perspective view of FIG. 1 showing the movable top covering of the transfer trailer of the present invention in a completely opened position.

Referring now to the figures, where like numerals are used to designate like structure, a transfer trailer of the present invention is generally indicated at 10. Referring specifically to FIG. 1, a semi-trailer, generally indicated at 12, includes a tractor, generally indicated at 14, and the trailer 10. The tractor 14 has a driver's cab 16 and a chassis 18, as shown in FIG. 5, extending from the rear of the driver's cab 16. The trailer 10 is removably attached to the chassis 18 for transporting debris or loose articles, such as crushed vehicles, generally indicated at 20 in FIG. 2. Tractors, such as the tractor 14, are well known in the art and can be of any suitable type that allows the trailer 10 to be attached to the tractor for hauling the crushed vehicles 20. The trailer 10 defines a container 22, as shown in FIG. 2, for directly receiving the crushed vehicles 20 from a loading apparatus, generally indicated at 24 in FIG. 4. Each of the trailer 10 and tractor 14 includes a plurality of wheels 26 for moving the trailer 10 and tractor 14. The number of wheels 26 of the trailer 10 depends upon the dimensions of the trailer 10.

It will be appreciated by those having ordinary skill in the art that the container 22 can receive and the trailer 10 can transport any suitable kind of debris and loose articles and any suitable amount of such debris and any suitable number of such loose articles. It will be appreciated also that the semi-trailer 12, in general, and each of the trailer 10 and tractor 14, in particular, can have any suitable size and structural relationship with respect to each other.

Still referring to FIG. 1, the trailer 10 includes, in general, a floor, generally indicated at 28, a top covering, generally indicated at 30, spaced from the floor 28 and adapted to substantially cover a top of the container 22, and at least a pair of walls, generally indicated at 32, 34, adapted to substantially cover respective sides of the container 22 and extend substantially between the floor 28 and the top covering 30. The top covering 30 and at least one wall 32 of the pair of walls 32, 34 are movable relative to the floor 28 between a closed position and an opened position. When the top covering 30 and the movable wall 32 are in the opened position, the trailer 10 provides an opening 36, as shown in FIG. 4, into the top and the respective side of the container 22 for directly receiving the crushed vehicles 20 from the loading apparatus 24. The trailer 10 includes also a controller, generally indicated at 38, for controlling the movement of the top covering 30 and the movable wall 32 between the closed position and the opened position.

In an embodiment of the trailer 10 and as shown in FIG. 1, the substantially complete, planar top surface of a substantially rectangular platform 40 defines the floor 28. The platform 40 is substantially coextensive with respect to the floor 28 in both the longitudinal and transverse directions. The platform 40 also is removably attached to the chassis 18 and extends longitudinally rearwardly from behind the driver's cab 16. The platform 40 is also supported above a plurality of axles 42, which connect respective opposed sets of wheels 26, and substantially symmetrically with respect to the opposed sets of wheels 26.

It will be understood by those having ordinary skill in the art that each of the platform 40 and floor 28 can have any suitable size and shape and the platform 40 and floor 28 can have any suitable structural relationship with respect to each other. It will be understood also that the platform 40 can have any suitable structural relationship with respect to each of the driver's cab 16 and wheels 26.

In the completely closed state of the trailer 10 as shown in FIG. 1, the pair of walls 32, 34 include a pair of side walls 32, 34 disposed opposite, spaced, and substantially parallel with respect to each other. The wall 34 is fixed, and the other wall 32 is movable relative to the floor 28 between the closed position and the opened position, as shown in FIG. 2. The trailer 10 includes further a fixed front wall 44 adapted to substantially cover a front of the container 22 and a fixed rear wall, generally indicated at 46, disposed opposite, spaced, and substantially parallel with respect to the front wall 44 and adapted to substantially cover a rear of the container 22. The pair of side walls 32, 34 extend between and substantially perpendicularly and coextensively in the vertical direction relative to the front and rear walls 44, 46, respectively. In this way, the trailer 10 defines a substantially elongated container 22 having a substantially rectangular transverse cross-section.

It will be appreciated by those having ordinary skill in the art that the trailer 10 can include any suitable number of walls greater than two having any suitable structural relationship with respect to each other. It will be appreciated also that any suitable wall(s) can be movable and any suitable wall(s) can be fixed. It will be appreciated also that the container 22 can have any suitable shape and size.

Figure 3:
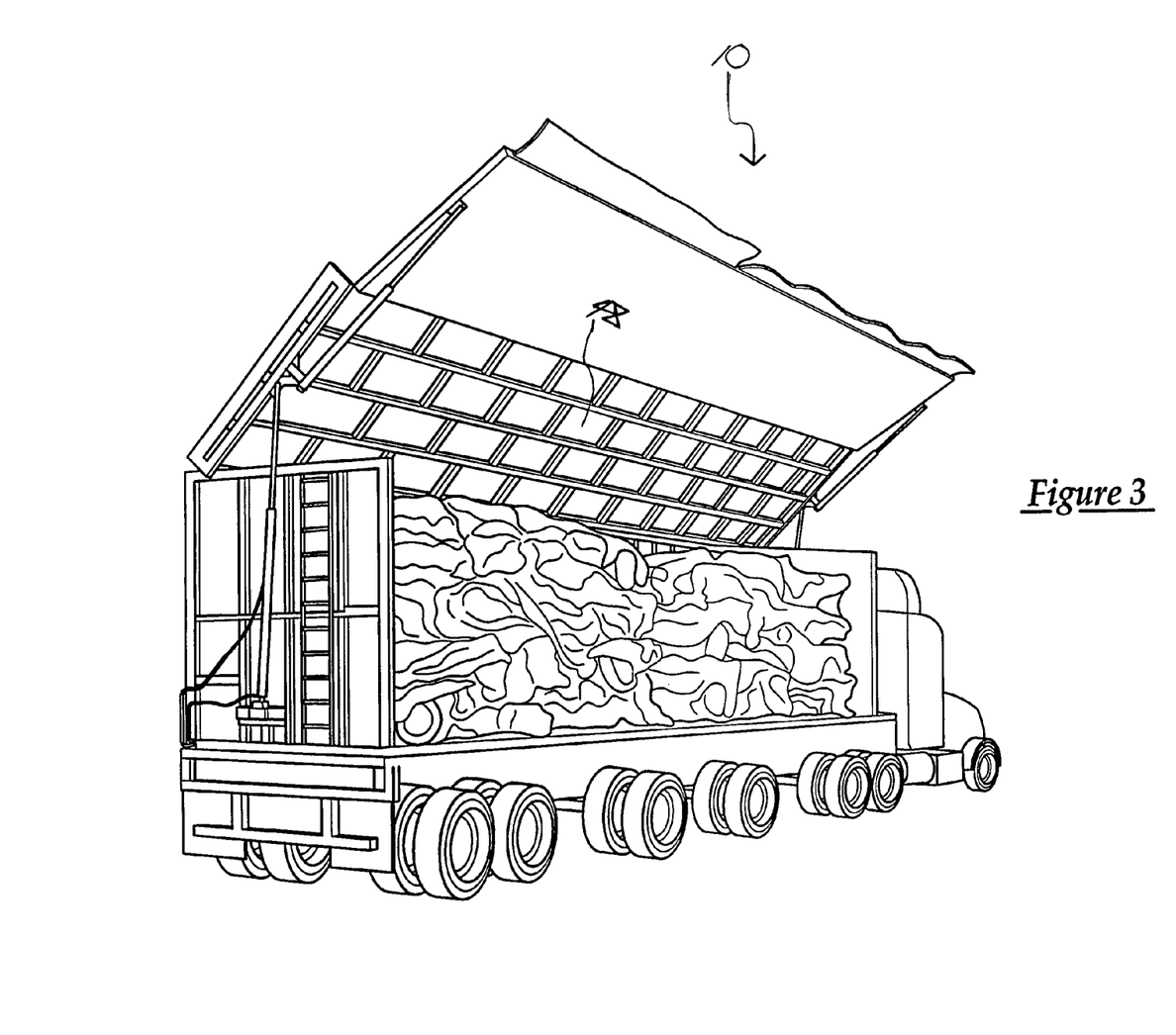
FIG. 3 is the perspective view of FIG. 2 showing the movable top covering of the transfer trailer of the present invention in a partially opened position.

Each of the walls 32, 34, 44, 46 and floor 28 is substantially completely solid, and the top covering 30 includes a plurality of openings 48, as shown in FIG. 3. The openings 48 are substantially uniformly rectangular and disposed substantially uniformly spaced with respect to each other in a plurality of staggered rows and adapted to act as a vent for the container 22 and provide structural integrity to the top covering 30 for holding down the crushed vehicles 20.

As shown in FIG. 1, at least one substantially rectangular flap 50 forms part of the movable side wall 32 and is disposed along the substantially entire longitudinal end of the movable side wall 32 proximate the floor 28. In each of FIGS. 2–4, a substantially identical pair of flaps 50 are shown. Each flap 50 is designed to hang loosely from the solid part of the movable side wall 32 and swing inwardly and outwardly to provide an opening 52 into the container 22. Furthermore, a plurality of substantially uniformly spaced binders or chains 54, for example, extend substantially parallel with respect to each other from the solid part of the movable side wall 32 to the platform 40. The chains 54 are tied down to posts or eyes (not shown), for example, provided on the platform 40 for preventing each flap 50 from opening during transit of the semi-trailer 12.

It will be understood by those having ordinary skill in the art that each of the floor 28, walls 32, 34, 44, 46, top covering 30, and flap 50 can have any suitable structure. For example, the top covering 30, like each of the walls 32, 34, 44, 46 and floor 28, can be substantially completely solid to form a substantially completely enclosed container 22 in the completely closed state of the trailer 10. In this way, loaded debris or loose articles are prevented from flying out of the trailer 10, especially when the trailer 10 reaches sufficiently excessive speeds during transport. It will be understood also that the at least one flap 50 can include any suitable number of flaps 50 and the chains 54 can have any suitable structural relationship with respect to the flap(s). It will be understood also that each of the openings 48, flap 50, and chains 54 is optional. If the flap 50 is omitted, then the solid movable side wall 32 may extend substantially to the floor 28 in the completely closed state of the trailer 10.

As shown in FIG. 1, the top covering 30 is attached to the top of each of the movable and fixed walls 32, 34, respectively, along corresponding imaginary lines of attachment defining corresponding axes "A1" and "A2." The movable wall 32 is rotatable about the axis "A1" defined by the imaginary line attaching the movable wall 32 and the top covering 30, and the top covering 30 is rotatable about the axis "A2," best shown in FIG. 5, defined by the imaginary line attaching the top covering 30 and the fixed wall 34.

More specifically, two sets of hinge-connector mechanisms, generally indicated at 56, 58, hingedly attach the top covering 30 to the movable and fixed walls 32, 34, respectively, such that the corresponding axes "A1," "A2" are defined along the corresponding sets of hinge-connector mechanisms 56, 58. Each set of hinge-connector mechanisms 56, 58 includes a plurality of substantially aligned, uniformly cylindrical hinge-connector mechanisms 56, 58 substantially uniformly spaced with respect to each other. The sets of hinge-connector mechanisms 56, 58 extend substantially the entire length of the movable and fixed walls 32, 34, respectively, and the top covering 30.

As shown in FIG. 2, the movable wall 32 is continuously rotatable at least about 90° outwardly and upwardly with respect to the floor 28. As shown in FIG. 4, the top covering 30 is continuously rotatable at least about 90° upwardly and outwardly with respect to the floor 28. In this way, the hinge-connector mechanism 56 allows the movable wall 32 to rotate from a position substantially perpendicular to the floor 28 to a position substantially parallel with the floor 28 and any position therebetween. In a similar fashion, the hinge-connector mechanism 58 allows the top covering 30 to rotate from a position substantially parallel with the floor 28 to a position substantially perpendicular to the floor 28 and any position therebetween, as shown in FIG. 3. In addition, the movable wall 32 is movable independently of movement of the top covering 30, as shown in FIG. 2, whereas the top covering 30 is movable independently of rotation of the movable wall 30, as shown in FIG. 5.

It will be apparent to one skilled in the art that any suitable mechanism can be used for hingedly attaching the top covering 30 to the movable and fixed walls 32, 34, respectively. It will be apparent also that such mechanism can have any suitable structure and structural relationship with respect to the top covering 30 and movable and fixed walls 32, 34, respectively. It will be apparent also that each of the movable wall 32 and top covering 30 can be rotatable any suitable number of degrees.

As shown in FIG. 1, the controller 38 is a hydraulic system used to control the rotation of each of the movable side wall 32 and top covering 30. Hydraulic systems are well known in the art, and, therefore, those having ordinary skill in the art will readily understand this system and its possible variations.

More specifically, the controller 38 includes at least one cylinder and, preferably, a pair of cylinders 60, 62 disposed at each of the front and rear walls 44, 46, respectively (only the pair of cylinders 60, 62 at the rear wall 46 shown). The cylinders 60, 62 are configured to hydraulically move, respectively, the movable wall 32 and the top covering 30. Each cylinder 60 has an extension member 64 that is forced outwardly from the cylinder 60 to rotate the movable side wall 32 outwardly and upwardly. The extension member 64 is also pulled inwardly into the cylinder 60 to rotate the movable side wall 32 downwardly and inwardly. In a like manner, each cylinder 62 has an extension member 66 that is forced outwardly from the cylinder 62 to rotate the top covering 30 upwardly and outwardly. The extension member 66 is also pulled inwardly into the cylinder 62 to rotate the top covering 30 downwardly and inwardly.

A valve (not shown), which is well-known in the art, may be mounted on the semi-trailer 12 and have two levers or switches (not shown) for actuating the hydraulic system. One lever actuates the cylinders 60 through corresponding hydraulic lines 68. The other lever actuates cylinders 62 through corresponding hydraulic lines 70. The valve may be connected by hydraulic lines (not shown) to the tractor 14, which supplies fluid, such as air, for operating the hydraulic system. The extension member 64, 66 of each cylinder 60, 62, respectively, may be pivotally bolted with a pin 72, for example, through two support beams 74 in the front or rear wall 44, 46, respectively.

In operation, the movable side wall 32 and top covering 30 rotate when the cylinders 60, 62, respectively, are actuated. When both the movable side wall 32 and top covering 30 are in the completely closed position, the container 22 is completely closed, as shown in FIG. 1. When the movable side wall 32 is in the completely opened position and the top covering 30 is in the completely closed position, the movable side wall 32 lies substantially in the same plane defined by the top covering 30, as shown in FIG. 2. When the movable side wall 32 is in the completely opened position and the top covering 30 is in a partially opened position, the movable side wall 32 lies substantially in the same plane defined by the top covering 30, as shown in FIG. 3. When the top covering 30 is in the completely opened position and the movable side wall 32 is in the completely closed position, the top covering 30 lies substantially in the same plane defined by the fixed side wall 34 and the movable side wall 32 lies substantially perpendicular to the top covering 30, as shown in FIG. 5. And, when both the top covering 30 and the movable side wall 32 are in the completely opened position, they lie substantially in the same plane defined by the fixed side wall 34, as shown in FIG. 4.

To rotate either the top covering 30 or the movable side wall 32, the appropriate lever of the valve is engaged. When the lever for actuating the movable side wall 32 is engaged, pressurized fluid flows through the hydraulic lines 68 to the cylinders 60. Then, the extension members 64 exert a force upon the movable side wall 32. As shown by a comparison of FIGS. 1 and 2, as the force against the movable side wall 32 increases, the set of hinge-connector mechanisms 56 begins to pivot, and the movable side wall 32 rotates outwardly and upwardly. The extension members 64 pivot about the respective pins 72 as the movable side wall 32 rotates.

After the movable side wall 32 has rotated completely outwardly and upwardly, the lever for actuating the hydraulic cylinders 60 defaults to a neutral position, allowing the movable side wall 32 to remain in the completely opened position until the lever is disengaged. When the lever is disengaged, the fluid returns through the hydraulic lines 68 to the valve and then through the hydraulic lines (not shown) to the tractor 14. As force from each of the extension members 64 is reduced and the extension members 64 are pulled back into the corresponding cylinders 60, the movable side wall 32 is pulled back into the completely closed position.

In a similar manner, when the lever for actuating the top covering 30 is engaged, pressurized fluid flows through the hydraulic lines 70 to the cylinders 62. The extension members 66 exert a force upon the top covering 30. As shown by a comparison of FIGS. 2 and 3, as the force against the top covering 30 increases, the set of hinge-connector mechanisms 58 begins to pivot, and the top covering 30 rotates upwardly and outwardly. The extension members 66 pivot about the respective pins 72 as the top covering 30 rotates.

After the top covering 30 has rotated completely upwardly and outwardly, the lever for actuating the hydraulic cylinders 62 defaults to a neutral position, allowing the top covering 30 to remain in the completely opened position until the lever is disengaged. When the lever is disengaged, the fluid returns through the hydraulic lines 70 to the valve and then through the hydraulic lines (not shown) to the tractor 14. As force from each of the extension members 66 is reduced and the extension members 66 are pulled back into the corresponding cylinders 62, the top covering 30 is pulled back into the completely closed position.

The levers controlling the movable side wall 32 and top covering 30 can be engaged simultaneously or separately. Moreover, any suitable type of fluid, such as a liquid, may be used. Operation of hydraulic systems in the above-described manner is well known in the art.

It will be readily apparent to those skilled in the art that the hydraulics can be controlled by a hydraulic system in the trailer 10 or driver's cab 16. It will be readily apparent also that the hydraulics can be controlled by a hydraulic system separate and apart from the semi-trailer 12. It will be readily apparent also that operation of the controller 38, of rotating the movable side wall 32 and top covering 30, can be performed in a variety of suitable ways. For example, electronics can be used for electrical control or a manual crank can be used for manual control of rotation of the movable side wall 32 and top covering 30. A gas motor and gas pump can be used as well. Although hydraulics are used in the embodiment of the trailer 10 described above, the trailer 10 is not limited by the method used to control rotation of each of the movable side wall 32 and top covering 30.

With use of the trailer 10, the loading process requires no more than two people—the driver of the semi-trailer 14 and/or loading apparatus 24—instead of three people. And, depending upon the load requirement, the loading capacity of the loading apparatus, and the size of the trailer, the loading process can take only about 6–10 minutes to complete, as opposed to about an hour and a half. When the steps of transporting and unloading the crushed vehicles are included, the entire process can take only about 30 minutes to complete, rather than about four hours.

The transfer trailer 10 permits relatively more efficiency and, thus, productivity in loading, transporting, and unloading the crushed vehicles 20. The transfer trailer 10 also is relatively more convenient for a person loading and unloading the trailer 10. The transfer trailer 10 also requires a relatively less amount of physical effort of the loader/unloader and possible inherent physical danger and discomfort to the loader/unloader. The transfer trailer 10 also does not require use of binders or chains to load and transport the crushed vehicles 20. The transfer trailer 10 also provides relatively more access to the inside of the trailer 10 through the top of the trailer 10. The transfer trailer 10 is also relatively less labor-intensive and time-consuming to load and unload. The transfer trailer 10 permits also the loading apparatus 24 to directly load the crushed vehicles 20 into and unload the crushed vehicles 20 from the trailer 10. The transfer trailer 10 also reduces or eliminates spillage of the crushed vehicles 20 upon loading, transport, and unloading of the crushed vehicles 20. The transfer trailer 10 permits also loading, transport, and unloading of crushed vehicles 20 of various kinds, sizes, and numbers.

The transfer trailer 10 has been described in an illustrative manner. It is to be understood that the terminology that has been used is intended to be in the nature of words of description rather than of limitation. Many modifications and variations of the transfer trailer 10 are possible in light of the above teachings. Therefore, within the scope of the appended claims, the transfer trailer 10 may be practiced other than as specifically described.

What is claimed is:

1. A transfer trailer defining a container for directly receiving articles from a loading apparatus, said trailer being removably attachable to a tractor for transporting the articles, said trailer comprising:

a floor;

a top covering spaced from said floor and adapted to substantially cover a top of said container;

at least a pair of walls adapted to substantially cover respective sides of said container and extending substantially between said floor and said top covering, at least one of said pair of walls and said top covering being movable relative to said floor between a closed position and an opened position, wherein when said movable wall and said top covering are in said opened position, said trailer provides an opening into the top and the respective side of said container for directly receiving the articles from the loading apparatus; and a controller for controlling the movement of said movable wall and said top covering between said closed position and said opened position, wherein said top covering is hingedly attached to said movable wall and the other of said pair of walls along corresponding imaginary lines of attachment defining corresponding axes, said movable wall being rotatable about the axis defined by the imaginary line attaching said movable wall and said top covering and said top covering being rotatable about the axis defined by the imaginary line attaching said top covering and the other of said pair of walls.

2. A transfer trailer as set forth in claim 1, wherein said at least a pair of walls includes further a front wall adapted to substantially cover a front of said container and a rear wall disposed opposite of and spaced from said front wall and adapted to substantially cover a rear of said container.

3. A transfer trailer as set forth in claim 2, wherein said trailer defines a substantially elongated container having a substantially rectangular transverse cross-section.

4. A transfer trailer as set forth in claim 1, wherein at least one hinge-connector mechanism hingedly attaches said top covering to each of said movable and fixed walls such that the corresponding axes are defined along the corresponding hinge-connector mechanisms.

5. A transfer trailer as set forth in claim 1, wherein said movable wall is rotatable at least about 90° outwardly and upwardly with respect to said floor and said top covering is rotatable at least about 90° upwardly and outwardly with respect to said floor.

6. A transfer trailer as set forth in claim 1, wherein said controller includes at least one cylinder configured to hydraulically move each of said top covering and said movable wall.

7. A transfer trailer as set forth in claim 1, wherein said movable wall is movable independently of movement of said top covering and said top covering is movable independently of movement of said movable wall.

8. A transfer trailer as set forth in claim 1, wherein said at least a pair of walls are substantially completely solid and said top covering includes a plurality of openings.

9. A truck for transporting articles, said truck comprising:
a tractor; and
a transfer trailer defining a container for directly receiving articles from a loading apparatus, said trailer being removably attachable to said tractor for transporting the articles, said trailer comprising:
a floor;
a top covering spaced from said floor and adapted to substantially cover a top of said container;
at least a pair of walls adapted to substantially cover respective sides of said container and extending substantially between said floor and said top covering, at least one of said pair of walls and said top covering being movable relative to said floor between a closed position and an opened position, wherein when said movable wall and said top covering are in said opened position, said trailer provides an opening into the top and the respective side of said container for directly receiving the articles from the loading apparatus; and
a controller for controlling the movement of said movable wall and said top covering between said closed position and said opened position, wherein said top covering is hingedly attached to said movable wall and the other of said pair of walls along corresponding imaginary lines of attachment defining corresponding axes, said movable wall being rotatable about the axis defined by the imaginary line attaching said movable wall and said top covering and said top covering being rotatable about the axis defined by the imaginary line attaching said top covering and the other of said pair of walls.

10. A truck as set forth in claim 9, wherein said at least a pair of walls includes further a front wall adapted to substantially cover a front of said container and a rear wall disposed opposite of and spaced from said front wall and adapted to substantially cover a rear of said container.

11. A truck as set forth in claim 10, wherein said trailer defines a substantially elongated container having a substantially rectangular transverse cross-section.

12. A truck as set forth in claim 9, wherein at least one hinge-connector mechanism hingedly attaches said top covering to each of said movable and fixed walls such that the corresponding axes are defined along the corresponding hinge-connector mechanisms.

13. A truck as set forth in claim 9, wherein said movable wall is rotatable at least about 90° outwardly and upwardly with respect to said floor and said top covering is rotatable at least about 90° upwardly and outwardly with respect to said floor.

14. A truck as set forth in claim 9, wherein said controller includes at least one cylinder configured to hydraulically move each of said top covering and said movable wall.

15. A truck as set forth in claim 11, wherein said movable wall is movable independently of movement of said top covering and said top covering is movable independently of movement of said movable wall.

16. A truck as set forth in claim 9, wherein said at least a pair of walls are substantially completely solid and said top covering includes a plurality of openings.

* * * * *